(12) United States Patent
Duval et al.

(10) Patent No.: US 8,358,607 B2
(45) Date of Patent: Jan. 22, 2013

(54) MULTIPLE ENTRY TERRESTRIAL REPEATER FOR A CONTENT BROADCASTING SYSTEM

(75) Inventors: Regis Duval, Velizy (FR); Michel Cohen, Velizy (FR); Joseph Blineau, Velizy (FR); Christian Le Floch, Clamart (FR)

(73) Assignee: Alcatel Lucent, Paris (FR)

( * ) Notice: Subject to any disclaimer, the term of this patent is extended or adjusted under 35 U.S.C. 154(b) by 469 days.

(21) Appl. No.: 12/311,029

(22) PCT Filed: Sep. 11, 2007

(86) PCT No.: PCT/EP2007/059501
§ 371 (c)(1),
(2), (4) Date: Jun. 19, 2009

(87) PCT Pub. No.: WO2008/034737
PCT Pub. Date: Mar. 27, 2008

(65) Prior Publication Data
US 2011/0249616 A1    Oct. 13, 2011

(30) Foreign Application Priority Data
Sep. 22, 2006   (FR) ...................................... 06 53905

(51) Int. Cl.
*H04B 7/14*   (2006.01)
(52) U.S. Cl. ........ 370/315; 370/338; 370/316; 370/480; 455/11.1
(58) Field of Classification Search .................. 370/315, 370/338, 316, 480; 455/11.1
See application file for complete search history.

(56) References Cited

U.S. PATENT DOCUMENTS

| | | | |
|---|---|---|---|
| 5,233,626 A * | 8/1993 | Ames ............................ | 375/148 |
| 5,854,793 A | 12/1998 | Dinkins | |
| 6,510,317 B1 * | 1/2003 | Marko et al. .................. | 455/428 |
| 6,876,623 B1 | 4/2005 | Lou et al. | |
| 6,944,139 B1 * | 9/2005 | Campanella .................. | 370/315 |
| 2002/0112249 A1* | 8/2002 | Hendricks et al. ............ | 725/136 |
| 2006/0276198 A1* | 12/2006 | Michelon et al. .......... | 455/456.1 |
| 2009/0086731 A1* | 4/2009 | Lee et al. ...................... | 370/389 |

FOREIGN PATENT DOCUMENTS

FR    2 871 635 A1    12/2005
WO   WO 01/67637 A    9/2001

* cited by examiner

*Primary Examiner* — Duc C Ho
(74) *Attorney, Agent, or Firm* — Carmen Patti Law Group, LLC

(57) ABSTRACT

A terrestrial repeater, comprising i) an interface means configured to receive a first data stream originating from a first satellite transmission network, a second data stream originating from a second transmission network, and a third data stream originating from a third terrestrial transmission network, and to transform the received streams into data packets; ii) a first processing means configured to select at least one part of the data packets of at least one of the first, second, and third streams received, and to process each selected stream portion to place the data packets it comprises into a selected broadcast format; and iii) a second processing means configured to combine the selected and processed stream portions to constitute a set of packets to be broadcast, convert the set of packets into at least one radio frequency signal, and amplify the at least one radio frequency signal in order to broadcast wirelessly towards at least one radio communication terminal.

13 Claims, 2 Drawing Sheets

MULTIPLE ENTRY TERRESTRIAL REPEATER FOR A CONTENT BROADCASTING SYSTEM

TECHNICAL FIELD

The invention concerns communication systems and more particularly the broadcast of contents by means of such systems via terrestrial repeaters towards radio communication terminals.

BACKGROUND

In this case, "communication system" shall mean a system constituted by at least one part of a satellite network comprising at least one broadcasting satellite, potentially of a geostationary type, and of at least one part of a terrestrial repeater network, installed at known locations and potentially coupled to (or installed in) base stations of a radio access network of a radio communication network. Such satellite(s) and terrestrial repeaters have, in particular, the task to broadcast contents intended for radio communication terminals. Such broadcast may take place either simultaneously via the satellite(s) and the terrestrial repeaters (receiving feeds from one or more satellite(s), potentially different from the satellite(s) providing the feeds to the radio communication terminals), or by means of a terrestrial network), which requires hybrid receiver radio communication terminals, or, alternatively, only via the repeaters (which receive their feed(s) via the satellite(s)).

Moreover, in this context the term "content" refers to voluminous sets of data defining a television, video, or audio (radio or music) program, or games, or multimedia, or a computer data file.

Furthermore, in this context a "radio communication terminal" shall be any (mobile or portable) communication equipment capable at least of receiving contents transmitted by means of waves (potentially via a satellite). Consequently, such equipment may also include mobile or cellular telephones, personal digital assistants (or PDAs), a television program radio receiver device, such as a video player or portable television set, a device for receiving video or music programs, a laptop computer, or a radio device installed on-board a vehicle (such as a car, truck, bus, train or similar).

In the abovementioned broadcasting systems, the terrestrial repeaters generally receive the contents to be relayed (or repeated) to radio (communication) terminals from a single source. The source is either a satellite of the satellite network of the broadcasting system (including the terrestrial repeaters), or else a terrestrial network. Accordingly, the terrestrial repeater can repeat (or relay) the radio signals (which represent the contents to be broadcast) In only one of the three following ways: reception and retransmission in the frequency band used by the satellite and the radio communication terminals (e.g. the S band), reception in the frequency band used by the satellite (e.g. the Ku or Ka band) and retransmission within the frequency band of the radio communication terminals, and terrestrial reception and retransmission within the frequency band of the radio communication terminals.

As a result of this single source feed, terrestrial repeaters become unable to perform their function when there is a problem between the source of the contents and the repeaters. In any event, most terrestrial repeaters only repeat in their entirety the contents received, and can therefore not locally insert and/or delete content, e.g. in order to broadcast different contents depending on the region where they are installed.

The purpose of the invention is therefore to improve the situation.

SUMMARY

With this in mind, the invention proposes a terrestrial repeater comprising:
  interface means having as a function to receive a first data stream originating from a first satellite type transmission network, a second data stream originating from a second transmission network, and a third data stream originating from a third terrestrial type transmission network, and to transform the streams received into data packets,
  first processing means whose function it is to select at least one part of the data packets of at least one of the first, second, and third streams received, and to process each selected stream portion so as to place the data packets it comprises into a selected broadcasting format, and
  second processing means whose function it is to combine the stream portions selected and processed in order to constitute a set of packets to be broadcast, then to convert the set into at least one (analog) radio frequency (RF) signal, and to amplify the (analog) RF signal with a view to its broadcast via waves towards at least one radio (communication) terminal.

The terrestrial repeater according to the invention may comprise other characteristics, which may be taken separately or in combination, in particular:
  its first processing means may comprise switching modules whose function it is to select at least one part of the data packets delivered by the interface means, and modulation means whose function it is to apply a selected modulation to each selected portion of the streams in order to place the data packets comprised in this portion into the broadcast format;
    the modulation means may comprise one or more (e.g. three) modulators associated respectively to one or more (e.g. three) adjacent transmission channels, each modulator being designed so as to apply the chosen modulation to each portion of stream selected and switched towards it by the switching means, and intended for broadcast within the channel associated to it;
    in that case, its first processing means may e.g. comprise synchronization means whose function it is to synchronize the processing of a part of a stream by each modulator with the processing of the same portion of the stream by the pertinent modulator within other terrestrial repeaters of the same type, in order to constitute single frequency networks (or SFN);
      it may also comprise means for the reception of satellite navigation signals (e.g. of the GPS type) designed to deduct a reference time for the navigation signals received. In that case, the synchronization means have the function to synchronize them as a function of the reference time;
  its second processing means may have the function of adding a frequency change to the conversion of a set of packets in a radiofrequency signal;
  its second processing means may comprise, firstly, combination means serving to combine the selected and processed parts of the stream and to deliver, as an output, at least two sets of identical packets, secondly, at least two digital-analog converters, each of which serves to convert one of the sets of packets to an (analog) radiofrequency signal, and, thirdly, at least two amplifiers, each associated to a transmission sector and to one of the converters, and each serving to amplify one of the (analog) radiofrequency signals with a view to its being broadcast;

its interface means and its first processing means can e.g. be part of one and the same processing card;

the satellite transmission system may e.g. be a broadcasting network;

the second transmission network may e.g. be a radio broadcasting network of a terrestrial and/or satellite type;

the third transmission network may e.g. be a fixed terrestrial broadcasting network;

it may comprise transmission means having the function at least to emit (analog) radiofrequency signals delivered by the second processing means;

it may share, with a base station belonging to a radio access network of a radio communication network, transmission means appropriate for broadcasting (analog) radiofrequency signals delivered by its second processing means.

The invention also proposes a base station for a radio access network of a radio communication network, and comprising i) radio transmission means having the function to emit radiofrequency signals intended for radio (communication) terminals, ii) a terrestrial repeater of the type of that introduced above and suitable for delivery of the first (analog) RF signals to be broadcast, and iii) frequency multiplexing means for the first RF (analog) signals and the second RF (analog) signals received in order to broadcast frequency multiplexes towards the radio terminals.

As a variant, the base station may comprise i) radio transmission means having the function of sending/receiving (analog) radiofrequency signals to/originating from radio terminals, and ii) multiplexing means having the function of frequency multiplexing first (analog) radiofrequency signals delivered by a terrestrial receiver of the type introduced above, and second (analog) radiofrequency signals received, in order to broadcast frequency multiplexes toward the radio terminals.

DESCRIPTION OF THE DRAWINGS

Characteristics and advantages of the invention will become apparent upon examining the detailed description below, and the attached drawings, in which.

DETAILED DESCRIPTION

The goal of the invention is to enable feeds to a terrestrial repeater by means of three different networks (a first satellite transmission network, a second terrestrial and/or satellite transmission network, and a third terrestrial transmission network).

Below, it shall be assumed, by way of example and not of limitation, that the first satellite transmission network (R1) is a broadcasting network (e.g. of type DVB-S/S2), that the second transmission network (R2) is a terrestrial radio broadcast network (e.g. of the type MPEG-TS), and the third terrestrial transmission network (R3) is an IP ("Internet Protocol") fixed transmission network (e.g. of the Ethernet type).

However, the invention is not limited to these examples of transmission networks. In fact, they also include transmission networks authorizing bi-directional communications, as well as potentially radio (or Hertzian), satellite or terrestrial broadcasting networks, authorizing (at least) unidirectional communications as well as all combinations of these two network types. Thus, networks of the WiMAX or HF types and all other radio network types are also included.

Furthermore, it is assumed in what follows, by way of example and not of limitation, that the terrestrial repeater (RT) has the function of broadcasting analog radiofrequency (RF) signals in the DVB-H format (or standard) (or any of its further developments in process in the DVB-SS group) e.g. in the S band. However, the invention is not limited to this type of broadcast format (or standard). In fact, it concerns any retransmission frequency band, and more particularly the L or VHF bands.

Figure 1:
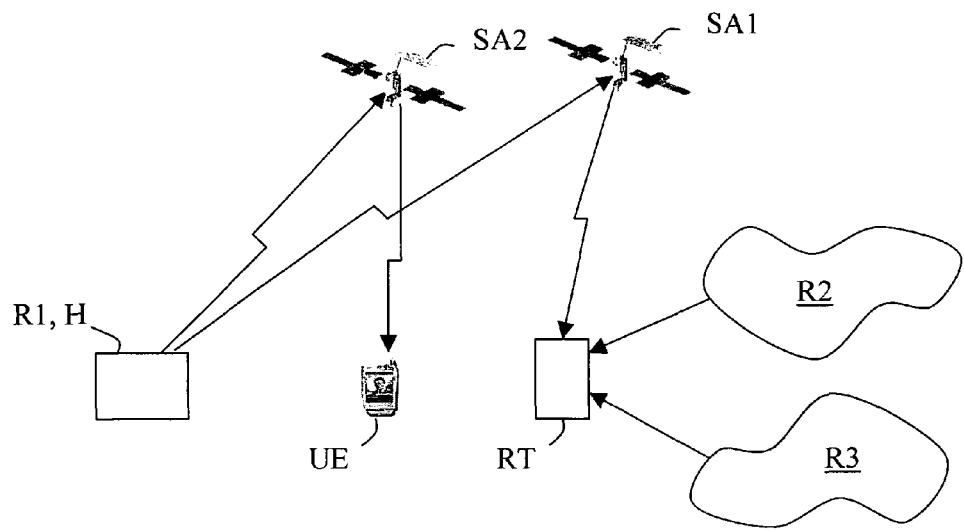
FIG. 1 highly schematically depicts an example of a (hybrid type) broadcasting system equipped with a terrestrial repeater embodiment according to the invention.

Reference is made first of all to FIG. 1 to present a hybrid communication system enabling implementation of the invention. It should be noted that the invention also refers to non-hybrid communication systems, i.e. those in which the radio communication terminals receive data only by terrestrial (and not satellite) radio.

As is schematically illustrated, the hybrid (communication) system comprises:

at least one part of a satellite network R1 (in this case, of the DVB-SSP type), comprising at least one first transmission satellite SA1, potentially of the geostationary type and having the function of broadcasting content received towards terrestrial repeaters RT, at least one second transmission satellite SA2, potentially of the geostationary type and having the function of broadcasting content received towards radio communication terminals UE, and at least one satellite hub H having the function of providing content feeds to satellites SA1 and SA2 (e.g. television programs). It will be noted that it could be considered that one and the same satellite broadcasts contents received both toward RT terrestrial repeaters and radio communication terminals UE.

At least one part of a terrestrial repeater network RT (in this case, only one terrestrial repeater is represented in order not to clutter the Figure), installed at known sites. As will be seen at a later stage, a terrestrial repeater RT may potentially be coupled to (or installed in) the base station of a radio access network of a radio communication network. However, this is not mandatory. Each terrestrial repeater RT receives feeds from the three networks (sources of contents) designated as R1 to R3 as stated above.

Radio communication terminals UE, hereafter referred to as radio terminals, equipped, for example, with a hybrid radio receiver in order simultaneously to receive radio signals (in this case, DVB-SSP, e.g. with a waveform of the TDM type) broadcast by the second satellite(s) SA2 and the radio signals (in this case, DVB-SSP e.g. with a waveform of the OFDM type) broadcast by the terrestrial repeaters RT. It shall be noted that the radio terminals UE may simply be equipped with a traditional terrestrial radio receiver when the satellite(s) have only the function of transmitting (analog) radiofrequency signals only to the terrestrial repeaters RT and not also simultaneously to the terrestrial repeaters RT and to the radio terminals UE (as is the case in the example illustrated).

The radio terminals UE may be portable or mobile. In what follows, it is assumed by way of example but not of limitation that the communication terminals are mobile (or cellular) telephones. However, they could also be personal digital assistants (PDAs), television program radio receivers, such as television (TV) "walkman" devices or portable TV sets, devices for receiving video or music programs, laptop computers, or radio devices installed on-board a vehicle (such as a car, truck, bus, train or similar).

It is important to note that the invention concerns the broadcast of all types of content, i.e. voluminous sets of data defining a television, video, or audio (radio or music) program, or games, or multimedia, or a computer data file.

Figure 2:
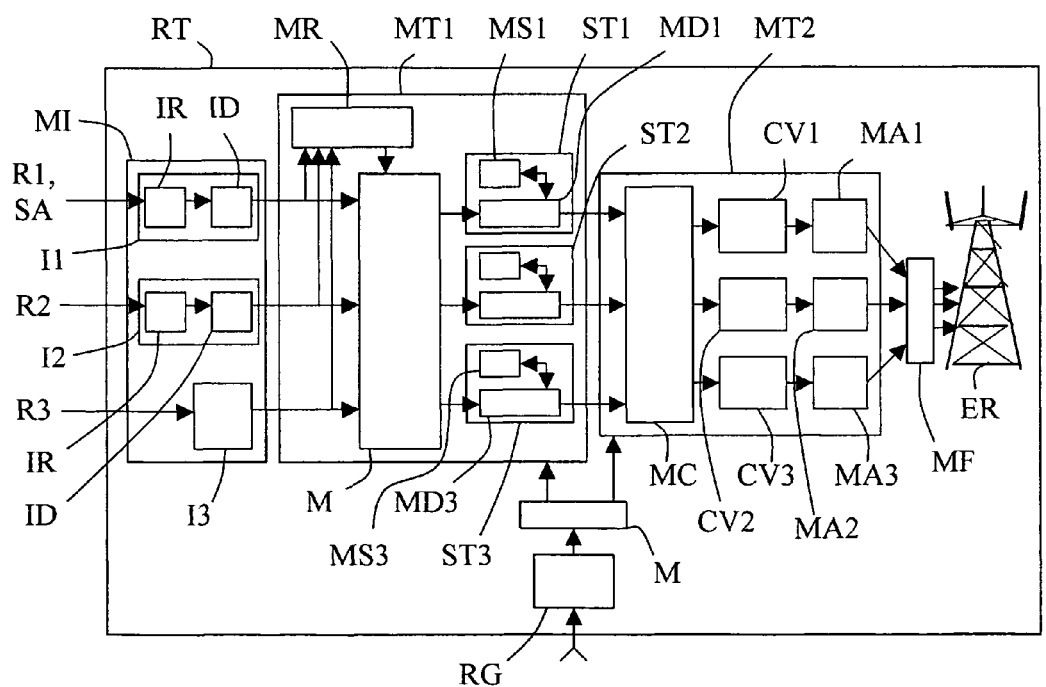
FIG. 2 highly schematically depicts a first embodiment of a terrestrial repeater according to the invention, and FIG. 3 highly schematically depicts an example of a base station equipped with a second embodiment of a terrestrial repeater according to the invention, The attached drawings may serve not only to complete the invention, but also to contribute to its definition as necessary.

As is schematically and functionally illustrated in FIG. 2, a terrestrial repeater RT according to the invention comprises at least interface means MI, first processing means MT1 and second processing means MT2 coupled to one another.

Although this is not shown in FIG. 2, at least one part of the interface means MI and the first processing means MT1 can e.g. be part of one and the same processing card.

The interface means MI define three entry points of the terrestrial repeater RT that, respectively, receive feeds of a first data stream (in the form of radiofrequency signals (in this case of DVB-SSP type)) transmitted by the first satellite SA1 of the satellite network R1, a second data stream (in the form of digital signals (in this case of MPEG-TS type)) emanating from the diffusion terrestrial or satellite broadcasting network R2, and a third data stream (in the form of digital signals (representing, in this case, IP packets)) emanating from the terrestrial network R3.

These interface means MI have the function of transforming the streams received into data packets, e.g. in the MPEG-TS format. For this purpose, they comprise three interface modules Ii (i=1 to 3), each of which is dedicated to one of the three streams.

The first interface module I1 comprises e.g. a set of IR equipment comprising a satellite receiver antenna, an amplifier, e.g. of the low noise type (LNA, Low Noise Amplifier), to amplify the analog signals RF received, a frequency converter having the function of converting the analog signals RF amplified in a so-called intermediate frequency band (IF), and a tuner having the function of converting such IF signals to digital signals in the baseband.

The first interface module I1 comprises, above all, a demodulation module ID having as a function at least to demodulate the digital signals (in the baseband) in order to deliver data according to a selected format, in this case MPEG-TS. The demodulation is, for example, of the QPSK or 8PSK type.

It is important to note that the entire set of IR equipment and the demodulation module ID constitute a network termination that can be wholly or partially external to the potential processing card.

It should be noted that the demodulation module ID can equally and optionally have the function of applying additional processing called "descrambling" when the signals transmitted by the first satellite SA1 of the first network R1 have constituted the subject of a spectrum spread by means of scrambling codes. This additional processing is only applied to the "payload" of MPEG-TS packets (i.e. 188 bytes per packet).

The demodulation module ID of the first interface module I1 therefore delivers on output what is generally referred to as program or content payload blocks, typically IP packets (of MPE (Multi Protocol Encapsulator) type) encapsulated in TS (Transport Stream) type packets containing program (or content) blocks.

The second interface module I2 comprises e.g. a set of IR equipment comprising a terrestrial or satellite radio receiver antenna, an amplifier, e.g. of the low noise type (LNA) to amplify the analog signals RF received, a frequency converter having the function of converting the analog signals RF amplified in the intermediate frequency band (IF), and a tuner having the function of converting such IF signals to digital signals in the baseband.

The second interface module I2 may also comprise a demodulation module ID having as a function at least to demodulate the digital signals (in the basic band) in order to deliver data according to a selected format, in this case MPEG-TS.

It is important to note that the entire set of IR equipment and the demodulation module ID constitute a network termination that can be wholly or partially external to the potential processing card.

It should be noted that the demodulation module ID can equally and optionally have the function of applying additional processing called "descrambling" (of the type described above) when the signals transmitted by the second satellite R2 have constituted the subject of a spectrum spread by means of scrambling codes.

The demodulation module ID of the second interface module I2 therefore delivers on output what is generally referred to as program or content payload blocks, typically IP packets (of MPE type) encapsulated in TS type packets containing program (or content) blocks.

It is important to note that the second interface module I2 need not comprise the entire set of IR equipment and the demodulation module when it directly receives signals in the MPEG-TS format, e.g. over a DVB-ASI (DVB Asynchronous Serial Interface) type link. In that case it constitutes a simple interface, e.g. of the DVB-ASI type, delivering broadcast ready TS type packets or TS type packets containing MPE type portions.

The third interface module I3 comprises an analog-digital converter having the function of converting analog radiofrequency signals received from the third network R3 (which constitute simple IP streams) into digital signals. It acts on the physical (PHY) and MAC (Medium Access Control) layers.

It may also potentially have the function of implementing a secure protocol so as to authenticate the source of the IP packets and/or to verify data integrity and/or deny double transmission (a function also called "anti-replay"). For example, error correction processing of the FEC type can enable correction of the packets, recovery of packets not received, and rescheduling of packets received on a simple IP stream.

It may equally and optionally have the function of applying additional processing called "descrambling" (of the type described above) when the signals transmitted by the third satellite R3 have constituted the subject of a protection by means of scrambling codes.

The third interface module I3 therefore delivers on output what is generally referred to as program or content payload blocks, typically IP packets (of MPE type) encapsulated in TS type packets containing program (or content) blocks.

The function of the first processing means MT1 is to select at least one part of the data packets emanating from at least one of the first, second, and third streams received, and to process each selected stream portion so as to place the data packets it comprises into a selected broadcasting format, in this case DVB-SSP.

To do so, the first processing means MT1 comprise at least one switching module (or switch) MA coupled to modulation means MDj (in this case j=1 to 3, by way of example but not of limitation).

The switching module MA has the function of selecting, based on chosen programming, at least one part of the data packets (here in the TS format) that are delivered by the interface means MI, and more specifically by their three interface modules I1 to I3, and to deliver the selected packet portions (or blocks) on one or more output points. In other words, the switching module MA routes towards one or more of its output points all or part of the data packets received on some of its entry points.

It will be noted that in the presence of encapsulated packets, the switching module MA may also have the function of decapsulating the packets before delivering them on one or more of its output point(s).

In order to enable local content insertion and/or extraction, the terrestrial repeater RT may, as illustrated in FIG. 2, comprise an insertion/extraction module MR coupled to the interface means MI and to the switching module MA. The insertion/extraction module MR more particularly has the function of reorganizing and signaling assembled blocks (packets) with the purpose of locally inserting or extracting blocks (of content) and of adapting the speed of incoming blocks. Block insertion takes place via the switching module MA.

The function of the modulation means MDj is to apply a selected modulation to each portion of the streams selected by the switching module MA in order to place the data packets contained in this portion into the selected broadcast format, in this case DVB-SSP.

In the illustration of FIG. 2, provided by way of example but not of limitation, the modulation means MDj comprise three modulators MD1 to MD3 associated respectively to three adjacent transmission channels (e.g. of 5 MHz bandwidth each), in accordance with the standard governing the DVB-SSP format, still being defined.

It is important to note that the number of modulators MDj depends, in particular, on the format of the selected transmission channel (bandwidth). Therefore, the terrestrial repeater may comprise just one modulator or else two, or even more than three if necessary.

Each modulator MDj is therefore coupled to one of the output points of the switching module MA in order to apply the chosen modulation (in this case, of DVB-SSP type) to each stream portion selected and switched (or routed) towards it by the switching module MA, and where such stream portion is designed to be transmitted on the channel associated with it.

Each modulator MDj may potentially be adapted so as to support powerful encoding and/or long time interleaving.

The different modulators MDj, which all (in this case) work within a bandwidth of 5 MHz preferably use one and the same working frequency defined based on a local clock.

It should be noted that the different modulators MDj may potentially be configured in different ways with different sets of configuration parameters. Furthermore, each MDj modulator may potentially be individually activated or deactivated.

As shown by way of example but not of limitation on FIG. 2, each modulator MDj may potentially be coupled to a synchronization module MSj together with which it constitutes a sub-processing module STj. The synchronization modules MSj are necessary to ensure the independent operation of hybrid or terrestrial single frequency networks (SFN).

Each synchronization module MSj (also called SFN (Single Frequency Network) adapter) has the function of synchronizing processing of that portion of the modulator MDj stream to which it is associated with the processing of the same stream portion by the corresponding modulator MDj at the other terrestrial repeaters RT of the same type. In other terms, the synchronization modules MSj have the function to adjust the buffer storage time of data packets (or blocks) originating from the different streams received in order for the modulators MDj of the different terrestrial repeaters RT present within one and the same zone to broadcast the same data (content portions) at the same time and using the same frequency. Adjustment of the storage times takes place just before modulation as a result of the timing markers contained in the MIP packets in MPEG-TS format and by means of a clock reference signal (sometimes called "$1pps$") supplied by a clock module MH.

The clock module MH generates all clock signals, and more particularly the reference signals, which are used for the operation of certain components constituting the terrestrial repeater RT. It defines such clock signals based on a reference time that is supplied by a receiver of satellite navigation signals RG, e.g. of the GPS type. The latter (RD) in fact has the function of deducting a reference time based on navigation signals received by it.

It shall be noted that the insertion/extraction module MR operates taking into account the time constraints imposed by the timing markers contained in the MIP packets.

The output point of each modulator MDj delivers, for the second processing means MT2, digital signals, preferably of I/Q type, i.e. in phase (I for "In-phase") and in quadrature (Q), according to constant baseband speed, on a bandwidth equal in this case to 5 MHz, and intended for one of the three channels.

The function of the second processing means MT2 is to combine the selected and processed stream portions (or blocks of content) that constitute the content of the three channels delivered by the first processing means MT1, in order to constitute a set of packets to be broadcast, then to convert this set into at least one analog radiofrequency signal, and to amplify the analog radiofrequency signal with a view to its broadcast by means of waves to at least one radio terminal UE.

To do so, the second processing means MT2 comprise a combination module MC, digital-analog conversion means CVk, and amplification means MAk, coupled to one another.

The function of the combination module MC is to combine the contents of the three channels (that had been selected and processed (in particular, modulated) by the first processing means MT1), in order to deliver, on output, as many identical packet sets as there are transmission sectors at the sender/receiver antenna ER used. Thus, each set has a bandwidth of 15 MHz (3×5 MHz) that satisfies the DVB-SSP broadcasting format.

In other words, the combination module MC regroups the I/Q type digital signals delivered by the output points of the three modulators MDj in order to constitute a set of I/Q type digital signals, and if the antenna ER has several sectors. it duplicates the set in order to deliver, on output, a number of sets that is equal to the number of sectors at the antenna ER.

In the illustration of FIG. 2, provided by way of example but not of limitation, the antenna ER has three transmission sectors, so that the combination module MC delivers, on three output points, three strictly identical sets of I/Q type digital signals. However, it could deliver just one set, or else two, or even more than three, depending on the number of sectors in the antenna ER. It would also be possible to use a single amplifier followed by a splitter designed to provide feeds to the different sectors of the antenna.

The digital-analog conversion means CVk comprise a number of digital-analog converters CVk that is a function of the number of output points of the combination module MC and therefore of the number of sectors in the antenna ER. Each digital-analog converter CVk has the function of converting the I/Q type digital signal sets (packets), delivered by the output of the combination module MC to which it is coupled, to an analog radiofrequency signal.

Preferably, each digital-analog converter CVk also has the function of changing the frequency of the input signals I and Q in order to convert it to the central broadcasting frequency (in this case, 2.1775 GHz).

The amplification means MAk comprise a number of amplifiers MAk that is a function of the number of output points of the combination module MC and therefore of the number of transmission sectors in the antenna ER. Each amplifier MAk has the function of amplifying the analog radiofrequency signal that is delivered by the digital-analog converter CVk to which it is coupled, with a view to its broadcast by one of the sectors of the antenna ER.

The terrestrial repeater RT may, as illustrated, comprise a filtering module MF placed at the output point of the amplifiers MAk and having the function of providing feeds to the different sectors of the antenna ER in the form of amplified and filtered analog radiofrequency signals exactly corresponding to the chosen broadcasting format (in this case, DBV-SSP—with a bandwidth of 15 MHz (or even 30 MHz in certain cases) and a central broadcasting frequency ranging from 2.17 to 2.2 GHz).

As shown by way of example but not of limitation in FIG. 2, the antenna ER is part of the terrestrial repeater RT. However, this is not mandatory. In fact, in a first variant (not shown), the terrestrial repeater RT may use the antenna ER of a base station SB (e.g. a Node B) belonging to a radio access network or a radio communication network (e.g. a UMTS network). In that case, the base station SB and the terrestrial repeater share the same antenna ER.

In a second variant (not shown), the terrestrial repeater RT sends feeds to a base station SB (e.g. a Node B) belonging to a radio access network or a radio communication network (e.g. a UMTS network), in the form of first broadcast-ready analog radiofrequency signals, and the base station SB comprises a multiplexing module MM having the function to frequency multiplex the first analog radiofrequency signals delivered by the terrestrial repeater RT and second analog radiofrequency signals, internally self generated in the standard manner (e.g. of the UMTS type). The multiplexing module MM then delivers to the antenna ER frequency multiplexes to be broadcast to the radio terminal UE.

Figure 3:
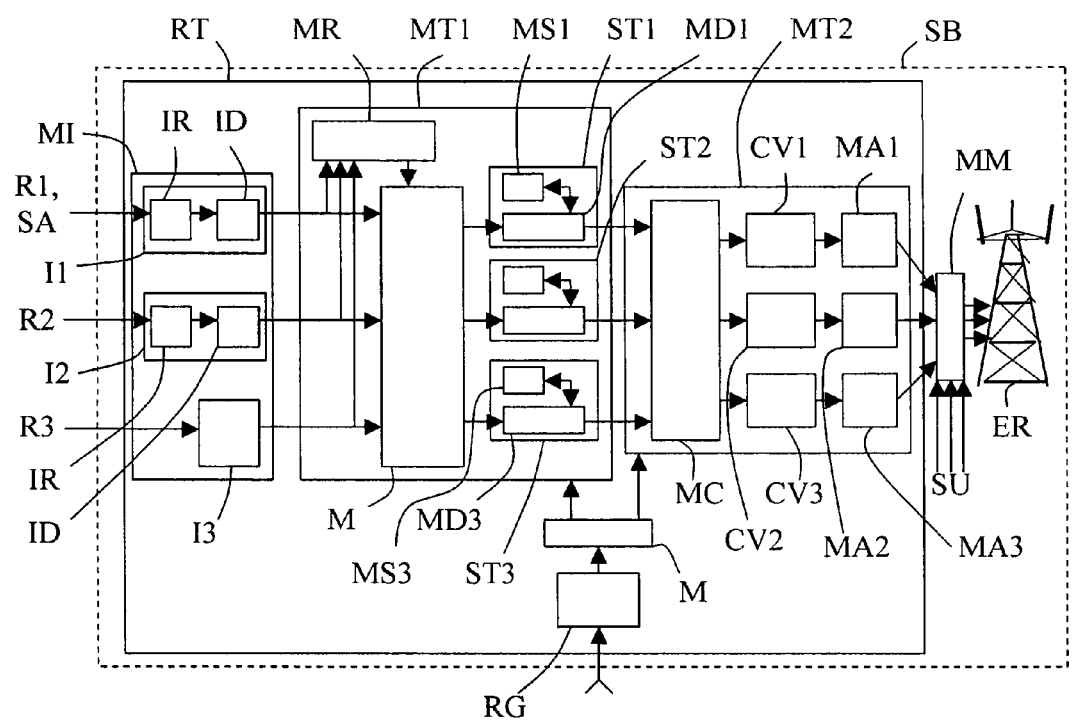

In fact, in a third variant illustrated in FIG. 3, the terrestrial repeater RT is part of a base station SB (e.g. a Node B) belonging to a radio access network or a radio communication network (e.g. a UMTS network). In that case, the base station SB comprises a multiplexing module MM (preferably including the filtering module MF presented above) that has the function of frequency multiplexing the first analog RF signals delivered by its terrestrial repeater RT and second analog RF signals SU (e.g. of the UMTS type) internally self generated in the standard manner. The multiplexing module MM then delivers to the antenna ER frequency multiplexes to be broadcast to the radio terminal UE.

Although not reflected on the individual Figures, each terrestrial repeater RT comprises control means having the function of controlling the operation of its respective different components.

It is important to note that the examples of terrestrial repeaters described earlier are intended for the broadcast of content to radio terminals UE. For this reason, they feature unidirectional downlinks (from the R1 to R3 networks) to the radio terminals UE. However, the terrestrial repeaters can also be used within the scope of bi-directional transmissions if the necessary adaptations are made.

The terrestrial repeaters according to the invention have several advantages, including:
substantial flexibility in use,
the option to set up specific services in certain areas lacking certain types of access,
local insertion/extraction of contents,
content source redundancy that is particularly useful in the event of unavailability of one or two among them.

The invention is not limited to the embodiments of the terrestrial repeater and the base station described above, which are only given by way of example; rather, it encompasses all variants that a person skilled in the art may envision within the scope of the Claims set forth below.

The invention claimed is:

1. A repeater, comprising:
   i) an interface unit configured to receive a first data stream originating from a first satellite transmission network, a second data stream originating from a second transmission network, and a third data stream originating from a third terrestrial transmission network, and to transform the streams received into data packets;
   ii) a first processing unit configured to select at least one part of the data packets of at least one of the first, second, and third streams received, and to process the selected stream portions to place the data packets into a selected broadcast format; and
   iii) a second processing unit configured to
      combine the selected stream portions to form a set of packets to be broadcast,
      convert the set of packets into at least one radio frequency signal, and
      amplify the at least one radio frequency signal in order to broadcast wirelessly towards at least one radio communication terminal.

2. The repeater according to claim 1, wherein the first processing unit comprises:
   a switching unit configured to select at least one part of the data packets delivered by the interface unit, and
   a modulation unit configured to apply a selected modulation to the selected portion of the streams to place the data packets comprised in the selected portion into the broadcast format.

3. The repeater according to claim 2, wherein the modulation unit comprises one or more modulators associated respectively to one or more adjacent transmission channels, the one or more modulators being configured to apply a chosen modulation to the stream selected and switched towards one of the one or more modulators by the switching unit, and intended for broadcast within a channel associated to the one of the one or more modulators.

4. The repeater according to claim 3, wherein the first processing unit comprises a synchronization unit configured to synchronize the processing of a part of a stream by the one or more modulators with the processing of the same portion of the stream by a pertinent modulator within other repeaters of a same type.

5. The terrestrial repeater according to claim 4, further comprising a reception unit for receiving satellite navigation signals configured to deduct a reference time for the satellite navigation signals received, wherein the synchronization unit is configured to synchronize the satellite navigation signals as a function of the reference time.

6. The repeater according to claim 1, wherein the second processing unit is configured to add a frequency change to a conversion of a set of packets in the at least one radio frequency signal.

7. The terrestrial repeater according to claim 1, wherein the second processing unit comprises;
- a combination unit configured to combine the selected and processed portions and to deliver, as an output, at least two sets of identical packets;
- ii) at least two digital-analog converters configured to convert one of the sets of identical packets to the at least one radio frequency signal; and
- iii) at least two amplifiers, each associated to a transmission sector and to one of the converters, and configured to amplify the at least one radio frequency signal.

8. The repeater according to claim 1, wherein the interface unit and the first processing unit are part of a same processing card.

9. The repeater according to claim 1, wherein the first satellite transmission network is a broadcast network.

10. The repeater according to claim 1, wherein the second transmission network is a terrestrial and/or a satellite radio broadcast network.

11. The repeater according to claim 1, wherein the third terrestrial transmission network is a fixed terrestrial transmission network.

12. The repeater according to claim 1, further comprising a transmission unit configured to transmit the at least one radio frequency signal delivered by the second processing unit.

13. A base station for a radio access network of a radio communication network, wherein the base station comprises:
- a radio transmission unit configured to transmit radio frequency signals to radio communication terminals, and
- a frequency multiplexing unit configured to frequency multiplex first radio frequency signals transmitted by a repeater in accordance with claim 1 and second radio frequency signals received in order to broadcast frequency multiplexes towards the radio communication terminals.

* * * * *